United States Patent
Jeong et al.

(10) Patent No.: US 10,031,613 B2
(45) Date of Patent: Jul. 24, 2018

(54) TOUCH SCREEN PANEL AND CONTROL METHOD THEREOF

(71) Applicant: Samsung Display Co., Ltd., Yongin-si, Gyeonggi-do (KR)

(72) Inventors: Ji Woong Jeong, Yongin-si (KR); Jae Won Jeong, Yongin-si (KR); Kyung Uk Choi, Yongin-si (KR)

(73) Assignee: Samsung Display Co., Ltd. (KR)

( * ) Notice: Subject to any disclaimer, the term of this patent is extended or adjusted under 35 U.S.C. 154(b) by 119 days.

(21) Appl. No.: 15/171,912

(22) Filed: Jun. 2, 2016

(65) Prior Publication Data

US 2017/0083143 A1    Mar. 23, 2017

(30) Foreign Application Priority Data

Sep. 18, 2015  (KR) .................. 10-2015-0132376

(51) Int. Cl.
- *G06F 3/041* (2006.01)
- *G06F 3/0354* (2013.01)
- *G06F 1/32* (2006.01)
- *G06F 3/03* (2006.01)

(52) U.S. Cl.
CPC .......... *G06F 3/0416* (2013.01); *G06F 1/3215* (2013.01); *G06F 1/3231* (2013.01); *G06F 1/3262* (2013.01); *G06F 3/0304* (2013.01); *G06F 3/03545* (2013.01); *G06F 2203/04101* (2013.01); *Y02B 60/1289* (2013.01); *Y02D 10/173* (2018.01)

(58) Field of Classification Search
None
See application file for complete search history.

(56) References Cited

U.S. PATENT DOCUMENTS

| | | | |
|---|---|---|---|
| 9,395,859 B1* | 7/2016 | Tate | G06F 3/041 |
| 2010/0245289 A1* | 9/2010 | Svajda | G06F 3/0421 345/175 |
| 2011/0128164 A1* | 6/2011 | Kang | G01C 21/3664 340/995.16 |
| 2012/0050231 A1 | 3/2012 | Westhues et al. | |
| 2015/0002554 A1* | 1/2015 | Kupershmidt | G09G 3/3208 345/690 |
| 2015/0042589 A1* | 2/2015 | Seo | G06F 21/36 345/173 |
| 2015/0109218 A1* | 4/2015 | Satou | G06F 3/0488 345/173 |
| 2017/0031523 A1* | 2/2017 | Seo | G06F 3/0418 |
| 2017/0048532 A1* | 2/2017 | Sadhwani | H04N 19/423 |
| 2017/0322649 A1* | 11/2017 | Wang | G06F 3/044 |

FOREIGN PATENT DOCUMENTS

KR  10-2014-0021504 A    2/2014

* cited by examiner

*Primary Examiner* — Christopher Kohlman
(74) *Attorney, Agent, or Firm* — Innovation Counsel LLP (57) ABSTRACT

Provided herein is a control method of a touch screen panel having an activated area divided into a plurality of touch areas, and a plurality of touch drivers each corresponding to each of the touch areas, the method including computing location information of a stylus pen based on photograph data; and controlling power of the touch drivers according to the computed location information.

20 Claims, 6 Drawing Sheets

TOUCH SCREEN PANEL AND CONTROL METHOD THEREOF

CROSS-REFERENCE TO RELATED APPLICATION

This application claims priority to and the benefit of Korean Patent Application No. 10-2015-0132376, filed on Sep. 18, 2015, in the Korean Intellectual Property Office, the entire contents of which are incorporated herein by reference in their entirety.

BACKGROUND

Field of Disclosure

Various embodiments of the present disclosure relate to a touch screen panel and a control method thereof.

Description of Related Art

A touch screen panel is an input device in which instructions appearing on a screen, such as an image display, may be selected by a user's hand or object to input the user's command. Since touch screen panels may be used as a substitute for separately existing input devices that need to be connected to an image display to be operated, such as a keyboard and mouse, their application range is expanding.

Well-known technologies for realizing a touch screen panel include the resistive overlay method, photosensitive method, and capacitive method. Of these types of touch screens, a capacitivetype touch screen panel includes sensing electrodes arranged on a touch activated area, so that when a person's hand or a stylus pen touches the screen, the touched position may be computed by sensing the changes in capacitance of the sensing electrodes caused by the touch. Stylus pens generally allow the user to make more elaborate inputs than allowed by fingers. They also provide drawing and writing functions, which is an advantage.

Touch screen panels are usually applied to mobile devices, such as smart phones, and thus, minimizing power consumption for efficient use of the battery would be advantageous. However, touch screen panels are becoming bigger as the display panels of mobile devices are becoming bigger, and special functions such as the multi-touch function are being provided, thereby increasing power consumption. Because a conventional touch screen drives all the sensing electrodes all the time, it consumes a lot of energy.

SUMMARY

According to an embodiment of the present disclosure, there is provided a control method of a touch screen panel having an activated area divided into a plurality of touch areas, and a plurality of touch drivers each corresponding to each of the touch areas, the method including computing location information of a stylus pen based on photograph data; and controlling power of the touch drivers according to the computed location information.

In an embodiment, the method may further include taking an image of the space within a viewing angle range on the touch activated area and generating the photograph data. In an embodiment, the location information may include a height location of the stylus pen on the touch activated area, and a plane location of the stylus pen on the touch activated area. In an embodiment, the height location may be a distance between the touch activated area and a tip of the stylus pen, and the plane location may be a coordinate value of where the tip of the stylus pen is located on the touch activated area. In an embodiment, computing the location information may involve estimating the height location by comparing a portion of the stylus pen recognized from the photograph data and pre-stored stylus pen information.

In an embodiment, controlling the power of the touch drivers my include a first power control step of controlling the power of the touch drivers in a lump sum according to the height location; and a second power control step of controlling the power of the touch drivers selectively according to the plane location. In an embodiment, the first power control step may involve, in response to the height location being smaller than a first reference value, controlling the touch drivers to convert to a power-on mode. In an embodiment, the first power control step may involve, in response to the height location being greater than the first reference value but smaller than a second reference value, controlling the touch drivers to convert to a standby mode.

In an embodiment, the first power control step may involve, in response to the height location being greater than the second reference value, controlling the touch drivers to convert to a power-off mode. In an embodiment, each of the touch areas may be divided into an inside area and a boundary area. In an embodiment, the boundary area may be located between the insides areas.

In an embodiment, the second power control step may involve, in response to the plane location being within the inside area of a touch area, controlling the touch drivers corresponding to the touch area where the insides area belongs to convert to a power-on mode, and controlling any remaining touch driver to convert to a power-off mode.

In an embodiment, the second power control step may involve, in response to the plane location being within the boundary area of a touch area, controlling the touch drivers corresponding to the touch area where the boundary area belongs to convert to a power-on mode, controlling the touch drivers corresponding to another touch area adjacent to the boundary area to convert to a standby mode, and controlling any remaining touch driver to convert to a power-off mode.

In an embodiment, the method may further include computing motion recognition information regarding motion of the stylus pen based on the photograph data. In an embodiment, the method may further include, in response to the motion recognition information corresponding to a predetermined pattern, executing a function corresponding to the predetermined pattern.

According to another embodiment of the present disclosure, there is provided a touch sensor including a plurality of sensing electrodes formed on a touch activated area, the touch activated area divided into a plurality of touch areas; a plurality of touch drivers configured to drive the sensing electrodes and that correspond to the touch areas; and a controller configured to compute location information of a stylus pen based on photograph data, and to control power of the touch drivers according to the computed location information.

In an embodiment, the location information may include a height location of the stylus pen on the touch activated area, and a plane location of the stylus pen on the touch activated area, and the controller may control the power of the touch drivers in a lump sum according to the height location and control the power of the touch drivers selectively according to the plane location.

In an embodiment, the controller, in response to the height location being smaller than a first reference value, may control the touch drivers to convert to a power-on mode; in response to the height location being greater than the first reference value but smaller than a second reference value, control the touch drivers to convert to a standby mode; and in response to the height location being greater than the second reference value, control the touch drivers to convert to a power-off mode.

In an embodiment, each of the touch areas may be divided into an inside area and a boundary area, and the controller, in response to the plane location being within the inside area of a touch area, may control the touch drivers corresponding to the touch area where the insides area belongs to convert to a power-on mode, and control any remaining touch driver to convert to a power-off mode.

In an embodiment, the controller, in response to the plane location being within the boundary area of a touch area, may control the touch drivers corresponding to the touch area where the boundary area belongs to convert to a power-on mode, control the touch drivers corresponding to another touch area adjacent to the boundary area to convert to a standby mode, and control any remaining touch driver to convert to a power-off mode.

BRIEF DESCRIPTION OF THE DRAWINGS

Example embodiments are now described more fully hereinafter with reference to the accompanying drawings; however, they may be embodied in different forms and should not be construed as limited to the embodiments set forth herein. Rather, these embodiments are provided so that this disclosure to help convey the scope of the present disclosure to those skilled in the art.

In the drawings, the dimensions of the figures may be exaggerated for clarity of illustration. When an element is referred to as being "between" two elements, it may be the only element between the two elements, or one or more intervening elements may also be present. Like reference numerals refer to like elements throughout.

DETAILED DESCRIPTION

Hereinafter, embodiments are described in greater detail with reference to the accompanying drawings, which include cross-sectional illustrations that are schematic illustrations of the embodiments (and intermediate structures). As such, variations from the shapes of the illustrations as a result, for example, of manufacturing techniques and/or tolerances, may occur. Thus, the embodiments should not be construed as limited to the particular shapes of regions illustrated herein but may include deviations in shapes that result, for example, from manufacturing. In the drawings, the lengths and sizes of layers and regions may be exaggerated for clarity. Like reference numerals in the drawings denote like elements.

Terms such as 'first' and 'second' may be used to describe various components, but they do not limit the various components. Those terms are only used for the purpose of differentiating a component from other components. For example, a first component may be referred to as a second component, and a second component may be referred to as a first component and so forth without departing from the spirit and scope of the present disclosure. Furthermore, 'and/or' may include any one of or a combination of the components mentioned.

Furthermore, 'connected/accessed' represents that one component is directly connected or accessed to another component or indirectly connected or accessed through an intermediate component.

In this specification, a singular form may include a plural form as long as it is not specifically mentioned otherwise in a sentence. Furthermore, 'include/comprise' or 'including/comprising' used in the specification represents that one or more components, steps, operations, and elements exist but does not exclude additional components, steps, operations, and elements.

Furthermore, unless defined otherwise, all the terms used in this specification, including technical and scientific terms, have the meanings as would be generally understood by those skilled in the related art. The terms defined in generally used dictionaries should be construed as having the meanings as would be construed in the context of the related art, and unless clearly defined otherwise in this specification, should not be construed as having idealistic or overly formal meanings.

Figure 1:
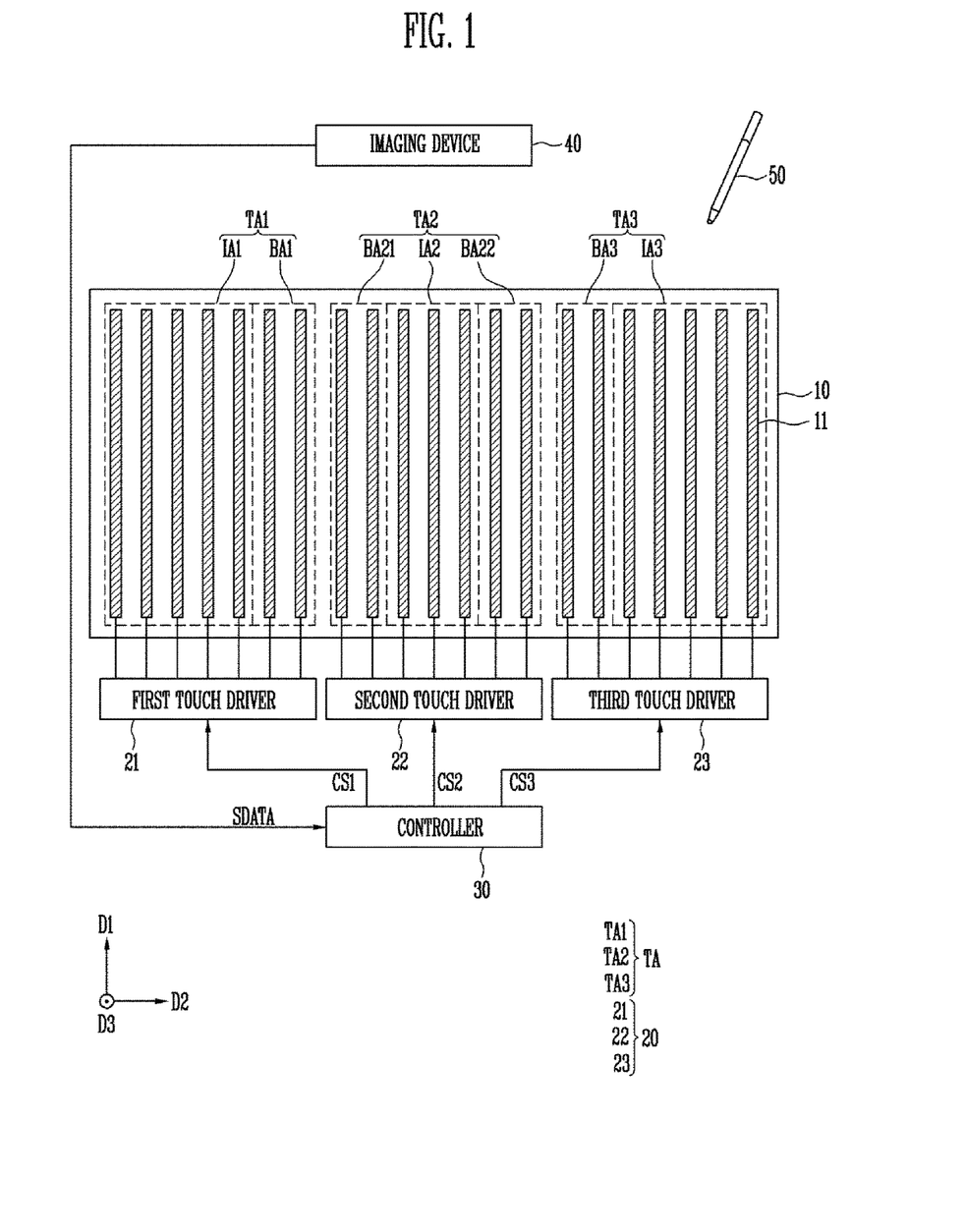
FIG. 1 is a diagram schematically illustrating a touch screen panel according to an embodiment of the present disclosure.

FIG. 1 is a diagram schematically illustrating a touch screen panel according to an embodiment of the present disclosure.

Referring to FIG. 1, the touch screen panel according to the embodiment of the present disclosure may include a touch sensor 10, touch drivers 20, controller 30 and imaging device 40.

The touch sensor 10 includes a plurality of sensing electrodes 11 formed on a touch activated area (TA). The sensing electrodes 11 are a plurality of conductive patterns for sensing a touch input. The sensing electrodes 11 may be evenly distributed across the touch activated area (TA).

In this embodiment, the sensing electrodes 11 are exemplified as a plurality of conductive patterns arranged in a first direction (D1) as a stripe structure, but there is no limitation thereto. Therefore, the sensing electrodes 11 may be selected from various well-known sensing methods, shapes, structures and materials of conductive patterns. For example, the sensing electrodes 11 may be a self-capacitive type single sensing electrodes, and may be at least one of the first sensing electrodes and second sensing electrodes of a mutual-capacitive method. Furthermore, the sensing electrodes 11 may be made of transparent conductive materials such as ITO (indium-tin-oxide), ATO (Antimony Tin Oxide), IZO (indium-zinc-oxide), CNT (carbon nano-tube), and graphene, and include a metal mesh pattern of a mesh structure.

The touch activated area (TA) is an area where a touch input may be made by a user's hand or a stylus pen 50. The touch activated area (TA) may be divided into a plurality of touch areas (TA1, TA2, TA3). Herein, each touch area may include a boundary area and an inside area. A boundary area may be located between adjacent inside areas, and the size of a boundary area may be set to be smaller than an inside area.

In this embodiment, the touch activated area (TA) includes a first touch area (TA1), second touch area (TA2), and third touch area (TA3). The first touch area (TA1) includes a first inside area (IA1) and a first boundary area (BA1). The second touch area (TA2) includes a second inside area (IA2), second left side boundary area (BA21), and second right side boundary area (BA22). The third touch area (TA3) includes a third inside area (IA3) and third boundary area (BA3). Herein, since the second touch area (TA2) is located between the first touch area (TA1) and the third touch area (TA3), the since second touch area (TA2) includes two boundary areas located at both sides.

The touch drivers 20 drive the sensing electrodes 11, and correspond to the touch areas (TA1, TA2, TA3). More specifically, the touch drivers 20 may supply a sense signal to the sensing electrodes 11, and identify a change of an electrical attribute value of the sense signal supplied. For this purpose, the touch drivers 20 may include a sense signal generating circuit (not illustrated), and an ADC (Analog-to-Digital Converter) for converting an analog type sense signal into a digital type sense signal. The touch drivers 20 may be provided with power (or driving voltage) from outside to drive and sense the sensing electrodes 11.

In this embodiment, the first touch driver 21 drives the sensing electrodes 11 located inside the first touch area (TA1), the second touch driver 22 drives the sensing electrodes 11 located inside the second touch area (TA2), and the third driver 23 drives the sensing electrodes 11 located inside the third touch area (TA3).

The controller 30 computes location information of the stylus 50 based in the photograph data (SDATA), and controls the power of the touch drivers 20 according to the computed location information. More specifically, the controller 30 analyzes the photograph data (SDATA) provided from the imaging device 40 and computes the location information of the stylus pen 50. The photograph data (SDATA) may include image data.

The location information may include a height location of the stylus pen 50 on the touch activated area (TA), and a plane location of the stylus pen 50. Herein, the plane location is a 2-dimensional value indicating the height on a plane defined by the first direction (D1) and the second direction (D2) intersecting the first direction (D1), and the height location is a 1-dimensional value indicating the location in the third direction (D3) intersecting the first direction (D1) and second direction (D2). For example, the height location may be defined as the distance between the touch activated area (TA) and the tip of the stylus pen 50, and the plane location may be defined as the coordinate value of the stylus pen 50 on the touch activated area (TA). For the controller 30 to analyze the photograph data (SDATA) and to determine the location of an object, a well-known image analysis technique may be used.

In an embodiment, the controller 30 may control the power of the touch drivers 20 in a lump sum according to the height location, and control the touch drivers 20 selectively according to the plane location. More specifically, the controller 30 may convert the power mode of the touch drivers 20. Power modes may include a power-on mode (or high power mode), standby mode (or low power mode), and power-off mode. The power-on mode is a state in which all the circuits in a touch driver operate normally. The standby mode is a state in which some of the circuits in a touch driver stopped operating. The power-off mode is a state in which all the circuits in a touch driver stopped operating. For example, in a standby mode, only the sense signal generating circuits from among the circuits in a touch driver may have stopped operating. Therefore, the power consumption in a touch driver is the greatest in the power-on mode, the smallest in the power-off mode, and the power consumption at the standby mode is smaller than the power-on mode but greater than the power-off mode.

In an embodiment, when converting the power mode of the touch drivers 20 according to the location information, the controller 30 may control the touch driver 20 to convert the power mode after the stylus pen 50 stays in one touch area.

In the embodiment, the controller 30 may provide a first control signal (CS1) to select the power mode of the first touch driver 21, provide a second control signal (CS2) to select the power mode of the second touch driver 22, and provide a third control signal (CS3) to select the power mode of the third touch driver 23. The specific method of controlling the power by the controller 30 is explained in detail hereinafter.

The imaging device 40 takes an image of the space within a viewing angle range on the touch activated area (TA) to generate the photograph data (SDATA), and provides the generated photograph data (SDATA) to the controller 30. The imaging device 40 may be embedded in a touch screen integrated display panel, or may be provided separately and be connected to the touch screen panel. For example, the imaging device 40 may be a camera embedded in a smart phone, or a camcorder mounted on a TV or a monitor.

Figure 2:
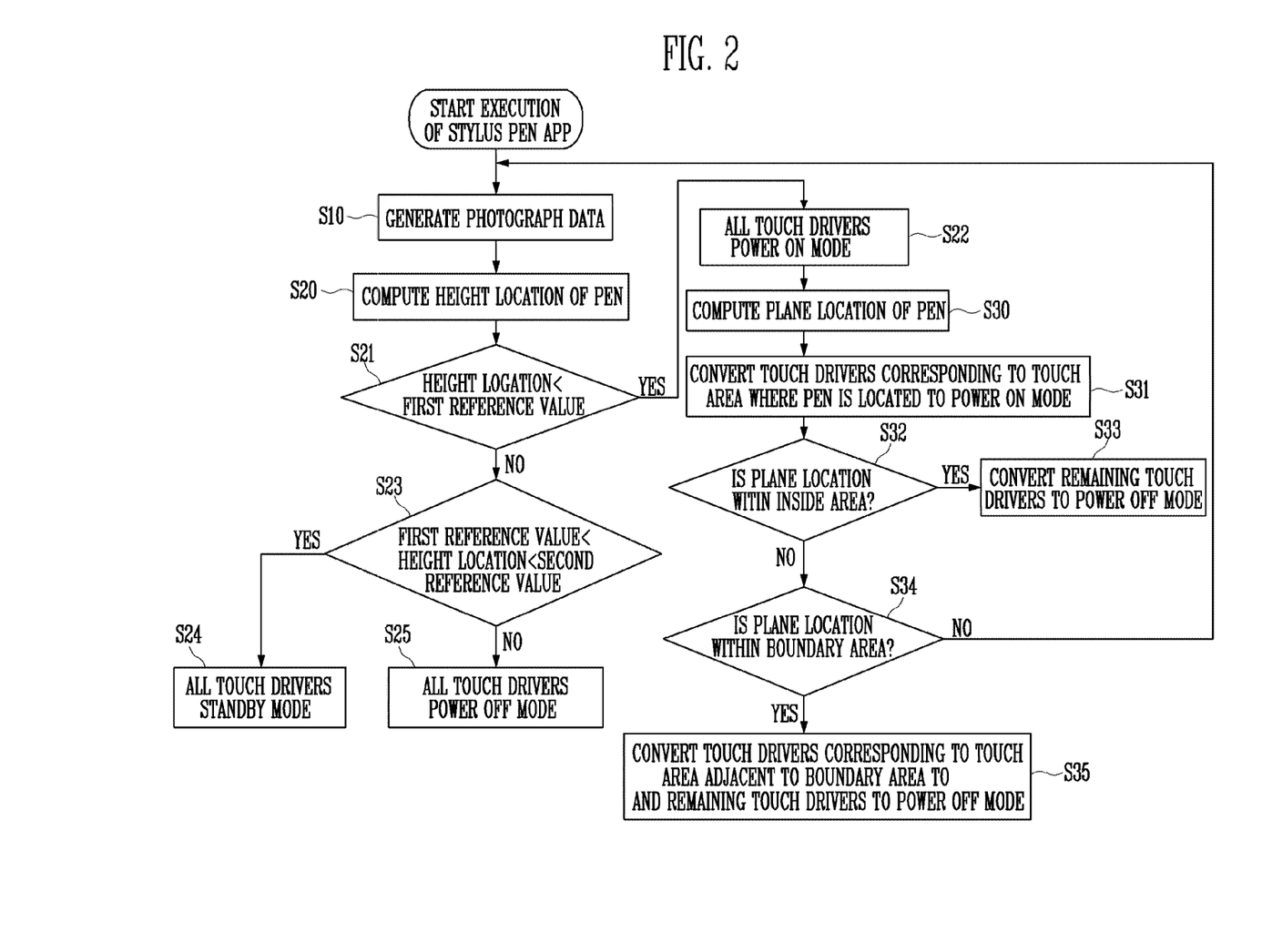
FIG. 2 is a flowchart illustrating a control method of a touch screen panel according to an embodiment of the present disclosure.
Figure 3:
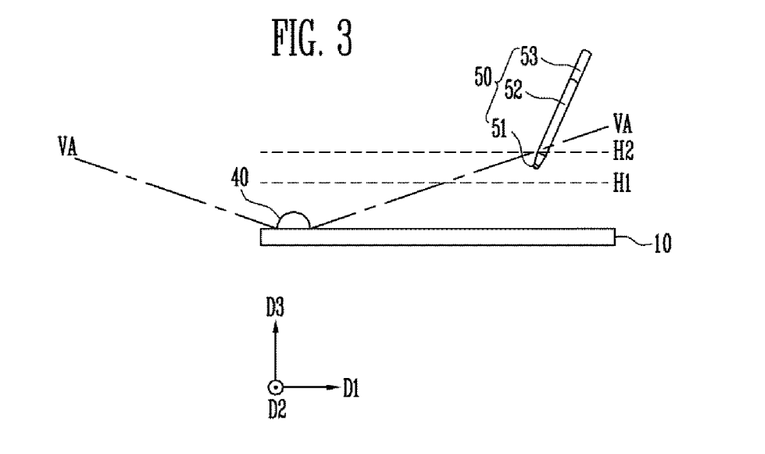
FIG. 3 is a side view for explaining a power control method of a touch screen panel according to a height location of a stylus pen.

FIG. 2 is a flowchart illustrating a control method of a touch screen panel according to an embodiment of the present disclosure, and FIG. 3 is a side view for explaining a power control method of a touch screen panel according to a height location of a stylus pen.

Referring to FIGS. 2 and 3, the imaging device 40 generates photograph data (SDATA) (S10). When a certain control signal is input or a touch input by a stylus pen 50 is sensed, the controller 30 controls the imaging device 40 to generate photograph data (SDATA), and receives the generated photograph data (SDATA). For example, when a stylus pen application is executed in a smart phone having a touch screen panel, the imaging device 40 installed on a top end of the touch sensor 10 is turned on, and the imaging device 40 takes an image of the space within a viewing angle (VA) range on the touch activated area (TA) and generates the photograph data (SDATA).

Next, the controller 30 analyzes the photograph data (SDATA) provided from the imaging device 40, and computes the height location of the stylus pen 50 (S20). Herein, the height location is the distance between the touch activated area (TA) and the tip 51 of the stylus pen. If the tip 51 of the stylus pen is outside the viewing angle (VA) range of the imaging device 40, the controller 30 may estimate the height location by comparing a portion of the stylus pen 50 recognized from the photograph data (SDATA) and the pre-stored stylus pen information. For example, the controller may estimate the height location of the tip 51 of the stylus pen by recognizing an intermediate section 52 or top end 53 of the stylus pen recognized from the photograph data (SDATA).

Next, the controller 30 determines whether or not the computed height location is smaller than a first reference value (H1) (S21). Herein, the first reference value (H1) may be set to be the maximum distance of the stylus pen 50 recognizable by the sensing electrodes 11. For example, the first reference value (H1) may be 3 cm, which is the distance in which magnetic communication is possible.

If the condition of step S21 is satisfied, the controller 30 controls the touch drivers 20 to convert to the power-on mode (S22). Since it is possible to recognize the plane location if the stylus 50 is within the distance of the first reference value (H1) from the sensing electrodes 11, the controller 30 converts all the touch drivers 20 in a lump sum to the power-on mode. If the touch drivers 20 had already been in the power-on mode from a previous point, the controller 30 maintains the current power mode.

If the condition of step S21 is not satisfied, the controller 30 determines whether or not the height location is smaller than a second reference value (S23). Herein, the second reference value (H2) may be set to be a suitable distance in preparation for a situation when the stylus pen 50 quickly enters within the first reference value (H1). For example, the second reference value (H2) may be 6 cm.

If the condition of step S23 is satisfied, the controller 30 controls the touch drivers 20 to convert to the standby mode (S24). Since the stylus pen 50 is in a distance not recognizable by the sensing electrodes 11, the touch drivers 20 need not be kept in the power-on mode. However, if the stylus pen 50 is within the second reference value (H2), considering that it could always get closer to the first reference value (H1) any time, the controller 30 converts the touch drivers 20 to the standby mode. Converting the touch drivers 20 from the power-off mode to the power-on mode requires a certain period of time, whereas a conversion from the standby mode to the power-on mode may be made faster.

If the condition of step S23 is not satisfied, the controller 30 controls the touch drivers 20 to convert to the power-off mode (S25). If both the condition of steps S21 and S23 are not satisfied, it means that the height location is greater than the second reference value (H2). The height location being greater than the second reference value (H2) may mean that the stylus pen 50 is quite far from the recognizable distance. Therefore, the controller 30 converts all the touch drivers 20 to the power-off mode, thereby reducing power consumption. In an embodiment, when all the touch drivers 20 are in the power-off mode, image taking by the imaging device 40 may be made continuously or at a predetermined interval.

After the step S22, with all the touch drivers 20 in the power-on mode, the touch drivers 20 or the controller 30 computes the plane location (S30). In an embodiment, the touch drivers 20 may drive the sensing electrodes 11 and provide a coordinate value corresponding to the location of the stylus pen 50 to the controller 30. Based on the coordinate value, the controller 30 may determine on which touch area of among the touch areas (TA1, TA2, TA3) the stylus pen 50 is located.

Next, the controller 30 controls the touch drivers corresponding to the touch area where the stylus pen 50 is located to convert to the power-on mode (S31). Furthermore, the controller 30 determines whether or not the plane location is within the inside area of the touch area (S32). If the condition of step S32 is satisfied, the controller 30 controls the remaining touch drivers to convert to the power-off mode (S33). That is, if the plane location is within an inside area of any one touch area, the controller 30 controls the touch driver corresponding to the touch area where the inside area belongs to convert to the power-on mode, and the remaining touch drivers to the power-off mode.

If the condition of step S32 is not satisfied, the controller 30 determines whether or not the plane location is within a boundary area of a touch area (S34). If the condition of step S34 is satisfied, the controller 30 controls the touch driver corresponding to the touch area adjacent to the boundary area to convert to the standby mode, and the remaining touch drivers to the power-off mode (S35). That is, if the plane location is within a boundary area of any one touch area, the controller 30 controls the touch driver corresponding to the touch area where the boundary area belongs to convert to the power-on mode, controls the touch driver corresponding to another touch area adjacent to the boundary area to convert to the standby mode, and controls the remaining touch drivers to convert to the power-off mode.

If the condition of step S34 is not satisfied, step 10 is performed once more. If the plane location is not within either the inside area or boundary area, it means that a recognition error has occurred or that the stylus pen 50 is distanced farther than the first reference value (H1) which is the recognition range of the stylus pen 50, and thus the initial step of generating photograph data (SDATA) may be performed all over again.

In another embodiment, the controller 30 may compute motion recognition information of the motion of the stylus pen 50 based on the photograph data (SDATA). Furthermore, if the computed motion recognition information corresponds to a predetermined pattern, a function corresponding to that predetermined pattern may be performed. For example, when a user makes a certain motion of shaking the stylus pen 50 to the left and right, the controller 30 may recognize the motion of the stylus pen 50 based on the photograph data (SDATA) taken, and perform the power saving function of controlling the power modes of the touch drivers 20.

FIGS. 4a, 4b, 4c and 4d are exemplary views for explaining a power control method of a touch screen panel according to a plane location of the stylus pen. Hereinafter, explanation is made based on an assumption that the height location of the stylus pen 50 is less than the first reference value (H1), and is moved from the first touch area (TA1) to the second touch area (TA2).

Figure 4A:
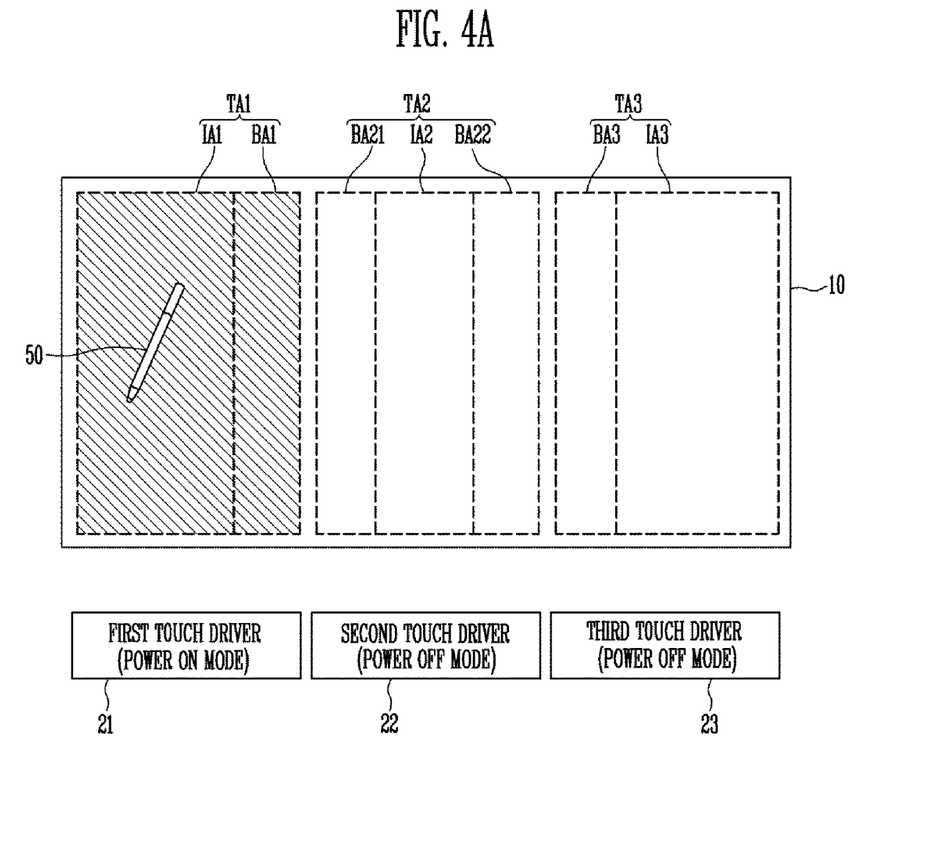
FIGS. 4a, 4b, 4c and 4d are exemplary views for explaining a power control method of a touch screen panel according to a plane location of the stylus pen.

First of all, referring to FIG. 4a, when the stylus pen 50 is located within the first inside area (IA1) of the first touch area (TA1), the controller 30 controls the first touch driver 21 corresponding to the first touch area (TA1) to convert to the power-on mode, and controls the second touch driver 22 and third touch driver 23 to convert to the power-off mode.

Figure 4B:
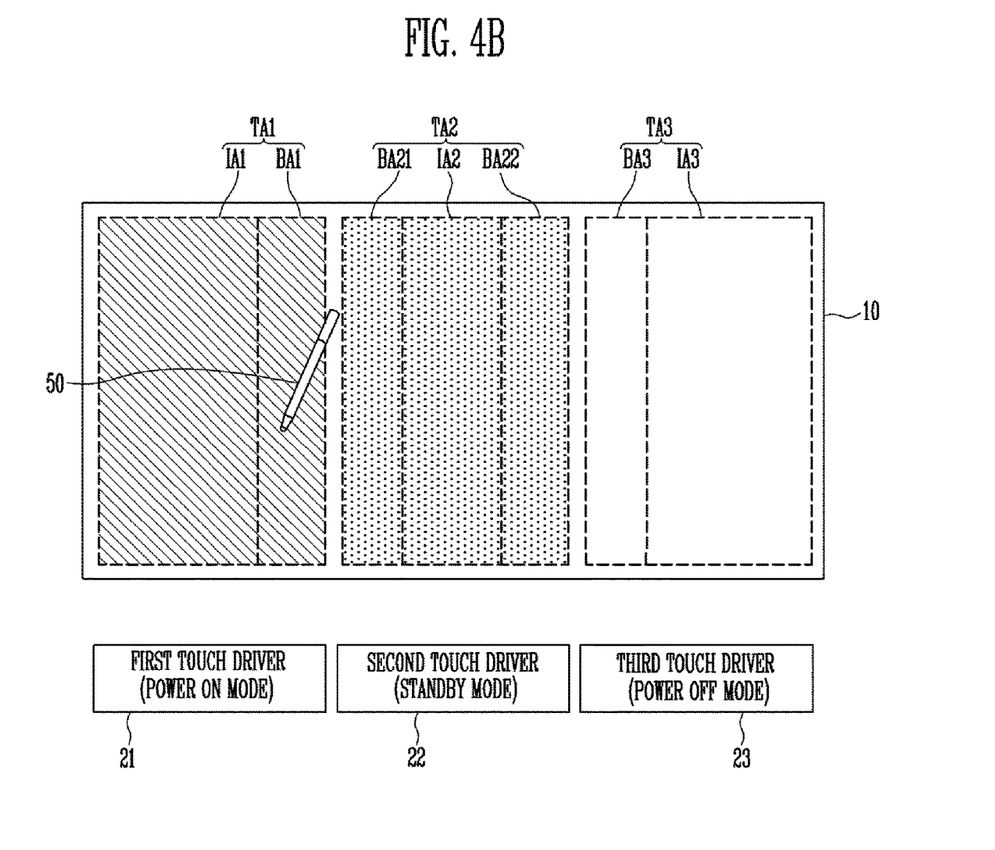

Referring to FIG. 4b, when the stylus pen 50 is located within the first boundary area (BA1) of the first touch area (TA1), the controller 30 controls the first touch driver 21 corresponding to the first touch area (TA1) to convert to the power-on mode, controls the second touch driver 22 corresponding to the second touch area (TA2), which is another touch area adjacent to the first boundary area (BA1), to convert to the standby mode, and controls the third touch driver 23 to convert to the power-off mode.

Figure 4C:
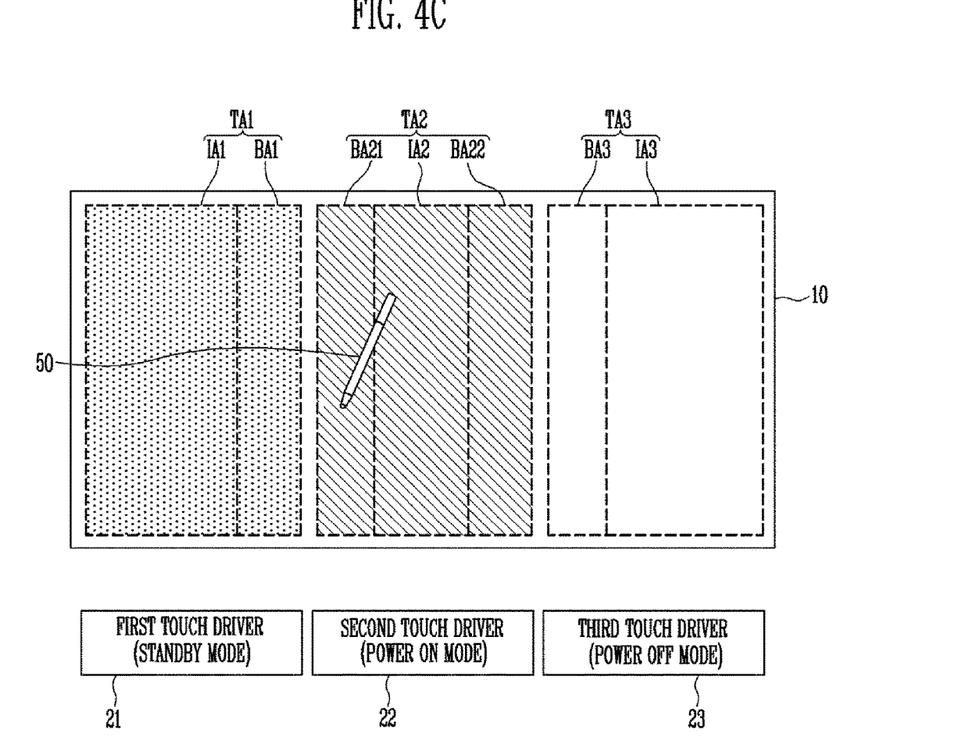

Referring to FIG. 4c, when the stylus pen 50 is located within the second left boundary area (BA21) of the second touch area (TA2), the controller 30 controls the second touch driver 22 corresponding to the second touch area (TA2) to convert to the power-on mode, controls the first touch driver 21 corresponding to the first touch area (TA1), which is another touch area adjacent to the second left boundary area, to convert to the standby mode, and controls the third touch driver 23 to convert to the power-off mode.

Figure 4D:
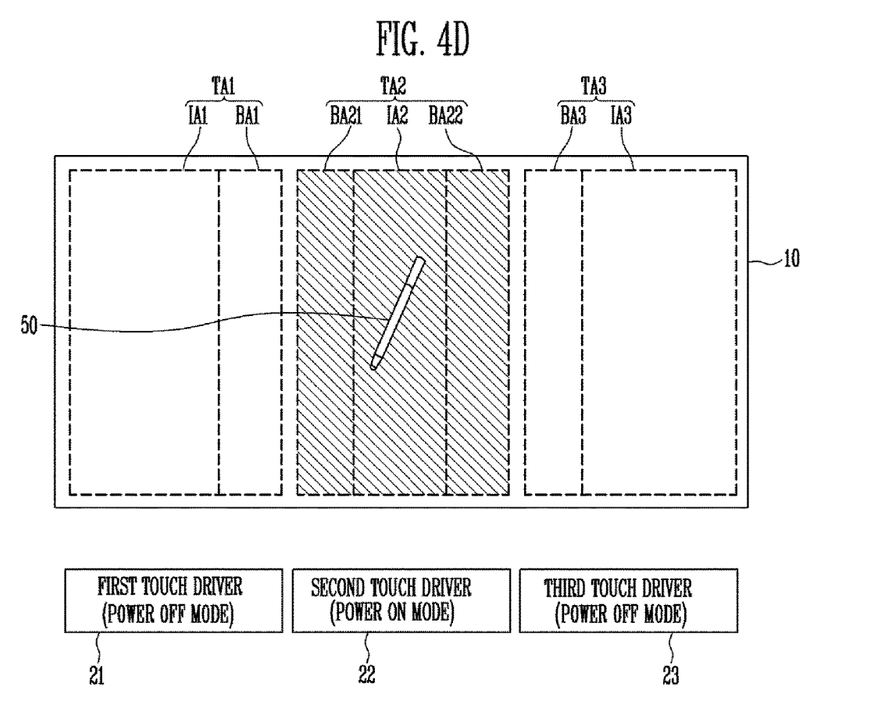

Referring to FIG. 4d, when the stylus pen 50 is located within the second inside area (IA2) of the second touch area (TA2), the controller 30 controls the second touch driver 22 corresponding to the second touch area (TA2) to convert to the power-on mode, and controls the first touch driver 21 and the third touch driver 23 to convert to the power-off mode.

According to the aforementioned embodiments of the present disclosure, a touch screen panel has an activated area divided into a plurality of touch areas, and a plurality of touch drivers each corresponding to each of the touch areas, such that location information of a stylus pen may be computed based on photograph data and used accordingly to selectively control the power of the touch drivers, thereby reducing power consumption when using the stylus pen.

Example embodiments are disclosed herein. Although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, those of skill in the art would recognize that various changes in form and details may be made without departing from the spirit and scope of the following claims.

What is claimed is:

1. A control method of a touch screen panel having an activated area divided into a plurality of touch areas, and a plurality of touch drivers each corresponding to each of the touch areas, the method comprising:
computing location information of a stylus pen based on at least comparing pre-stored stylus pen information and photograph data; and
controlling power of the touch drivers according to the computed location information.

2. The method according to claim 1,
further comprising taking an image of the space within a viewing angle range on the touch activated area and generating the photograph data.

3. The method according to claim 1,
wherein the location information comprises a height location of the stylus pen on the touch activated area, and a plane location of the stylus pen on the touch activated area.

4. The method according to claim 3,
wherein the height location is a distance between the touch activated area and a tip of the stylus pen, and the plane location is a coordinate value of where the tip of the stylus pen is located on the touch activated area.

5. The method according to claim 3,
wherein computing the location information involves estimating the height location by comparing a portion of the stylus pen recognized from the photograph data and the pre-stored stylus pen information.

6. The method according to claim 3,
wherein controlling the power of the touch drivers comprises:
a first power control step of controlling the power of the touch drivers in a lump sum according to the height location; and
a second power control step of controlling the power of the touch drivers selectively according to the plane location.

7. The method according to claim 6,
wherein the first power control step involves, in response to the height location being smaller than a first reference value, controlling the touch drivers to convert to a power-on mode.

8. The method according to claim 7,
wherein the first power control step involves, in response to the height location being greater than the first reference value but smaller than a second reference value, controlling the touch drivers to convert to a standby mode.

9. The method according to claim 8,
wherein the first power control step involves, in response to the height location being greater than the second reference value, controlling the touch drivers to convert to a power-off mode.

10. The method according to claim 6,
wherein each of the touch areas is divided into an inside area and a boundary area.

11. The method according to claim 10,
wherein the boundary area is located between the insides areas.

12. The method according to claim 10,
wherein the second power control step involves, in response to the plane location being within the inside area of a touch area, controlling the touch driver corresponding to the touch area where the inside area belongs to convert to a power-on mode, and controlling any remaining touch driver to convert to a power-off mode.

13. The method according to claim 10,
wherein the second power control step involves, in response to the plane location being within the boundary area of a touch area, controlling the touch driver corresponding to the touch area where the boundary area belongs to convert to a power-on mode, controlling the touch driver corresponding to another touch area adjacent to the boundary area to convert to a standby mode, and controlling an remaining touch driver to convert to a power-off mode.

14. The method according to claim 1,
further comprising computing motion recognition information regarding motion of the stylus pen based on the photograph data.

15. The method according to claim 14,
further comprising, in response to the motion recognition information corresponding to a predetermined pattern, executing a function corresponding to the predetermined pattern.

16. A touch screen panel comprising:
a touch sensor comprising a plurality of sensing electrodes formed on a touch activated area, the touch activated area divided into a plurality of touch areas;
a plurality of touch drivers configured to drive the sensing electrodes and that correspond to the touch areas; and
a controller configured to compute location information of a stylus pen based on at least comparing pre-stored stylus pen information and photograph data, and configured to control power of the touch drivers according to the computed location information.

17. The touch screen panel according to claim 16,
wherein the location information comprises a height location of the stylus pen on the touch activated area, and a plane location of the stylus pen on the touch activated area, and
the controller controls the power of the touch drivers in a lump sum according to the height location and controls the power of the touch drivers selectively according to the plane location.

18. The touch screen panel according to claim 17,
wherein the controller, in response to the height location being smaller than a first reference value, controls the touch drivers to convert to a power-on mode;
in response to the height location being greater than the first reference value but smaller than a second reference value, controls the touch drivers to convert to a standby mode; and
in response to the height location being greater than the second reference value, controls the touch drivers to convert to a power-off mode.

19. The touch screen panel according to claim 17,
wherein each of the touch areas is divided into an inside area and a boundary area, and the controller, in response to the plane location being within the inside area of a touch area, controls a touch driver corresponding to the touch area where the inside area belongs to convert to a power-on mode, and controls any remaining touch driver to convert to a power-off mode.

20. The touch screen panel according to claim 19, wherein the controller, in response to the plane location being within the boundary area of a touch area, controls the touch drivers corresponding to the touch area where the boundary area belongs to convert to a power-on mode, controls the touch drivers corresponding to another touch area adjacent to the boundary area to convert to a standby mode, and controls any remaining touch driver to convert to power-off mode.

* * * * *